Aug. 20, 1963　　　L. H. S. ROBLEE, JR　　　3,100,996
TEMPERATURE MEASURING INSTRUMENT
Filed Oct. 21, 1960

Leland H. S. Roblee, Jr. INVENTOR

BY W. O. T. Heilman

PATENT ATTORNEY

United States Patent Office 3,100,996
Patented Aug. 20, 1963

3,100,996
TEMPERATURE MEASURING INSTRUMENT
Leland H. S. Roblee, Jr., Metuchen, N.J., assignor to Esso Research and Engineering Company, a corporation of Delaware
Filed Oct. 21, 1960, Ser. No. 64,129
2 Claims. (Cl. 73—362)

The present invention is concerned with a device for measuring temperatures. More particularly, the present invention is concerned with the use of a resistance thermometer, employing the "skin effect" concept to measure rapidly fluctuating temperatures. In its specific aspects, the present invention concerns an instrument for measuring rapidly fluctuating temperatures by passing a high frequency current through a conventional metal temperature sensing element to obtain a measurement of the electrical resistance of the surface of the sensing element. The electrical resistance is a measure of the temperature of the surface.

In the past, a resistance type temperature measuring instrument was not found to be suitable for use in rugged service where it became necessary to measure rapidly fluctuating temperatures. For rugged service, a heavy wire temperature sensing element was required. This in turn reduced the response of the instrument to make it insensitive to rapid temperature fluctuations. Thus, the response time of conventional resistance thermometers is limited by heat transfer considerations. It follows that the larger the cross sectional area of the temperature sensing element, the slower will be its thermal response.

The present invention, on the other hand, allows the use of a heavy wire temperature sensing element in service requiring it to respond to rapid temperature fluctuations. This result is achieved by virtue of the phenomenon that occurs when high frequency alternating current is passed through a conductor. As the frequency is increased, the path of current flow is restricted more and more to the surface of the conductor.

For instance, when passing alternating current with a frequency of 10.45 megacycles per second through an 18 gage silver wire conductor, the observed resistance of the conductor is 12.98 times greater than its resistance when direct current is imposed upon said conductor. It is known that the resistance of a conductor is directly proportional to its cross-sectional area. Since direct current utilizes the total cross-sectional area of a conductor it is observed that alternating current of a frequency of 10.45 megacycles utilizes only 1/12.98th of the cross-sectional area of said 18 gage silver wire. This results in the electric current being conducted in a circular ring about 0.00078 inch thick on the surface of an 18 gage conductor. The small time required to transfer heat through this thin ring, as opposed to the time required to transfer heat through the whole wire accounts for the increased response of the temperature sensing wire when using high frequency current.

If, for instance, the foregoing 18 gage silver wire at a temperature of 200° F. was suddenly placed in a medium having a temperature of 2000° F., it may be shown that in 64 microseconds ($10^6$ microseconds=1 second) the temperature has reached 1800° F., at the circular ring .000787 inch beneath the surface of 18 gage silver wire.

Similarly, with the same temperature sensing element, and an alternating current having a frequency of 166.5 megacycles per second, the current travels in a circular band about .0002 inch thick on the surface of the temperature sensing element. If the element at a temperature of 200° F. was suddenly exposed to a temperature of 2000° F., the time required for the inside of the circular band to heat up to 1800° F. is about 4 microseconds.

The response time of the foregoing temperature sensing element may be further increased by using a material having a higher thermal conductivity than that of silver.

To obtain the benefit of using a high frequency alternating current with the conventional metal wire temperature sensing element, suitable electrical circuitry must be devised with a response at least equal to the thermal response of the temperature sensing element. Thus, it is an object of the present invention to provide a high response electrical circuit capable of measuring rapid temperature fluctuations.

The resistance of an electric current conductor increases as its temperature increases. Conventional means may be used to measure the change in resistance of the surface of the conductor by either measuring resistance directly with a bridge circuit or by measuring it indirectly with a voltmeter, or other suitable means.

The invention may be more fully understood by referring to the figures showing two adaptations of the present invention.

Figure 1:
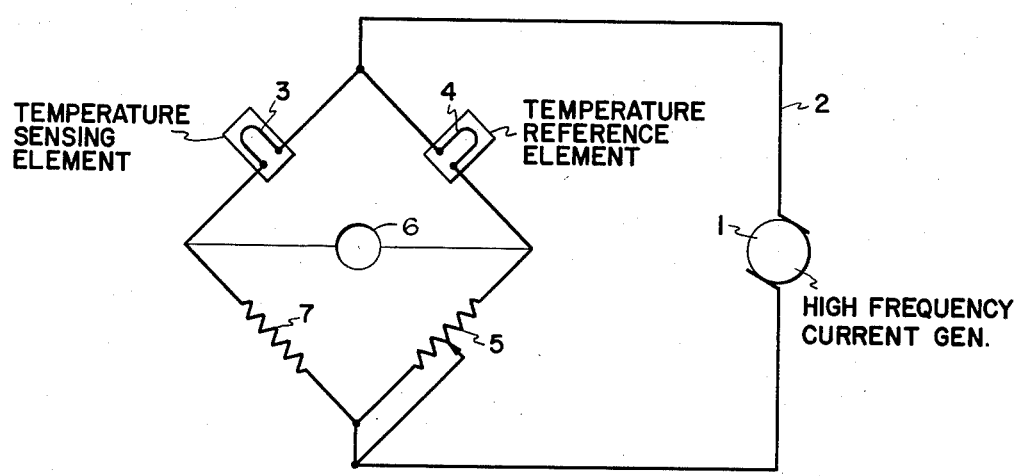
FIG. 1 is a diagrammatic view of a bridge circuit using the present invention.

Referring to FIG. 1 in more detail, a high frequency (10–10,000 megacycles per second) alternating current generator 1 with a power output of from 50 to 200 milliwatts transmits current by way of conductor 2 to the bridge circuit shown. Sensing element 3 is at the temperature being measured while reference element 4 is at the reference temperature resistance 7 has about the same resistance value as resistance 5 prior to any change in the environment of temperature sensing element 3. Balance 5 is used to change the resistance of the reference circuit to balance that of the sensing element 3. Detector 6 indicates when the resistance of the reference side of the bridge is equal to the resistance in the temperature sensing side. Thus, the change in resistance of the sensing element 3 due to the temperature change is measured directly by means of balance 5.

It may be noted that a circuit of this type is not capable of utilizing the present invention to the fullest extent because the response times obtainable are limited by the response of the balance means. Using commercially available balancing and detecting means, the response of the circuit is limited to about 0.1 seconds.

However, a circuit of this type can be used to indicate the occurrence of a temperature change. Detector 6, which can be a voltmeter, ammeter, galvonometer or other suitable means for detecting the unbalance in the bridge circuit, would immediately indicate the change in temperature on the surface of the sensing element.

When this circuit is used merely to indicate the occurrence of a temperature change, the response is limited by the thermal response of the temperature sensing element 3.

Figure 2:
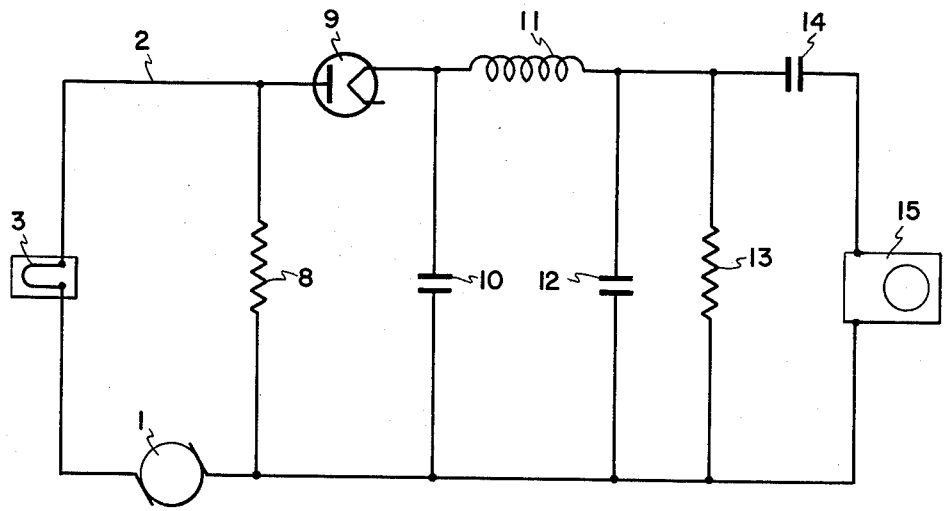
FIG. 2 is a diagrammatic view of a circuit wherein a measure of the temperature of the sensing element is depicted on an oscilloscope.

FIG. 2 illustrates suitable instrumentation for measuring the temperature on the surface of temperature sensing element 3.

High frequency current generator 1, with a power output of from 50 to 200 milliwatts supplies current alternating at a rate of from 10 to 10,000 megacycles per second to the circuit through conductor 2. Conductor 2 is a conventional conductor, and can be a coaxial cable type conductor.

The high frequency alternating current passes through temperature sensing element 3. Since the resistance of temperature sensing element 3 increases with temperature, the higher the temperature of temperature sensing element 3, the greater will be the voltage drop across it.

Temperature sensing element 3 is a conventional conductor preferably a metal having high thermal conductivity characteristics. Other factors will determine the type of metal and the size of the wire. Some of these factors are the corrosivity of the medium in which element 3 is placed and the temperature level of the medium.

The metal type and wire size of temperature sensing element should be selected with a view toward the frequency and magnitude of the alternating current to be imposed upon it.

The electrical resistance of temperature sensing element 3 should be such that the power loss through it does not cause element 3 to become a heating element. Of course, the electrical resistance of temperature sensing element 3 also varies with the frequency of the alternating current imposed upon it. Thus, there is a good deal of latitude in selecting workable components in a temperature measuring instrument of this nature.

Referring to FIG. 2, resistor 8 is a non-inductive resistor in series with temperature sensing element 3. Any current change in sensing element 3 caused by temperature changes also occur in resistor 8 and produces a change in voltage drop across resistor 8. The level of voltage across resistor 8 or the change in level is observed on oscilloscope 15.

Resistor 8 preferably has a resistance approximately that of sensing element 3 at the temperature of the medium and frequency of the alternating current.

Diode 9 is a half wave rectifier which acts as a detector to convert the high frequency A.C. to a pulsating D.C. voltage suitable for filtering by capacitors 10 and 12 and inductor 11.

Capacitors 10 and 12 in combination with inductor 11 act as a filter to prevent high frequency A.C. from flowing through the oscilloscope 15. These components are of such value as to allow sensing element changes at the rate of 1 to 10 megacycles per second to reach the oscilloscope 15.

Resistor 13 affords a D.C. current path for the rectified current from diode 9. Capacitor 14 prevents direct current from reaching oscilloscope 15. Long term steady state conditions of sensing element 3 will have little effect on the oscilloscope 15 indications. Changes in level of sensing element 3 will be observed.

Without capacitor 14, present steady state long term conditions plus changes will be indicated by oscilloscope 15.

Therefore, it is preferred to use the circuit in FIG. 2 so that the path of the electron beam as depicted on the face of oscilloscope 15 may be photographed or recorded by other suitable means.

The following is an example of the electrical circuit of the present invention as shown in FIG. 2. However, it is not intended that the present invention should be limited thereby.

With high frequency current generator 1 generating a current with a frequency of 500 megacycles per second, and a temperature sensing element 3 having an inductive reactance of 100 ohms at a frequency of 500 megacycles per second, the following are values for the equipment which may be used to obtain essentially direct current at oscilloscope 15.

The resistance of non-inductive resistance 8 is 100 ohms. Diode 9 is a 1N25 diode. Capacitor 10 has a capacitance of 1 micromicro farad. Inductor 11 has an inductance of 5 microhenrys. Capacitor 12 has a capacitance of 30 micro-microfarads and capacitor 14 has a capacitance of 0.1 microfarad. Resistor 13 has a resistance of 1000 ohms.

The current driving oscilloscope 15 is thus suitable to obtain a rapid measurement of temperature sensing element 3.

Having described the present invention, what is sought to be protected by Letters Patent is set forth in the following claims.

What is claimed is:

1. An instrument for measuring rapidly fluctuating temperatures comprising, in combination, a temperature sensing means consisting of a single electrical conductor exposed to the fluctuating temperature medium, the electrical resistance of said conductor changing with temperature, a high frequency electrical current generator supplying an alternating current connected in series with said conductor, wherein the frequency of said alternating current supplied to said conductor is in the range of 10 to 10,000 megacycles per second, the path of travel of said current over said conductor being substantially confined to the surface of said conductor, and a means responsive to measure the changes in electrical resistance of said temperature sensing means.

2. The apparatus of claim 1 wherein the temperature sensing means consists of silver wire.

References Cited in the file of this patent
UNITED STATES PATENTS

| 2,615,973 | Heath | Oct. 28, 1952 |
| 2,884,786 | Burk | May 5, 1959 |